US009811992B1

(12) United States Patent
Neuvirth-Telem et al.

(10) Patent No.: US 9,811,992 B1
(45) Date of Patent: Nov. 7, 2017

(54) CAREGIVER MONITORING SYSTEM

(71) Applicant: Microsoft Technology Licensing, LLC., Redmond, WA (US)

(72) Inventors: Hani Neuvirth-Telem, Tel Aviv (IL); Elad Yom-Tov, Hoshaya (IL); Hadas Bitran, Ramat HaSharon (IL); Omer Chechik, Netanya (IL); Amit Hilbuch, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 15/173,736

(22) Filed: Jun. 6, 2016

(51) Int. Cl.
*G05B 19/00* (2006.01)
*G08B 21/04* (2006.01)

(52) U.S. Cl.
CPC ..... *G08B 21/0492* (2013.01); *G08B 21/0407* (2013.01); *G08B 21/0453* (2013.01); *G08B 21/0476* (2013.01)

(58) Field of Classification Search
CPC ............................ G08B 21/0438; G08B 21/02
USPC ..... 340/5.8, 540, 541, 573.1, 539.13, 286.7, 340/665, 686.1
See application file for complete search history.

(56) References Cited

U.S. PATENT DOCUMENTS

| | | | |
|---|---|---|---|
| 6,819,256 B2 | 11/2004 | Hampton | |
| 7,259,671 B2 | 8/2007 | Ganley et al. | |
| 7,385,513 B2 | 6/2008 | Everest et al. | |
| 7,848,704 B2 | 12/2010 | Smith | |
| 8,031,075 B2 | 10/2011 | Buchnick et al. | |
| 8,094,013 B1 | 1/2012 | Lee et al. | |
| 8,659,414 B1 | 2/2014 | Schuk | |
| 8,934,015 B1 | 1/2015 | Chi et al. | |
| 9,020,622 B2 | 4/2015 | Shoham et al. | |
| 9,129,478 B2 | 9/2015 | Smith et al. | |
| 2004/0046658 A1 | 3/2004 | Turner et al. | |
| 2007/0069891 A1 | 3/2007 | Wallace et al. | |
| 2007/0182818 A1 | 8/2007 | Buehler | |
| 2008/0146361 A1 | 6/2008 | Godiska | |
| 2008/0214949 A1 | 9/2008 | Stivoric et al. | |
| 2008/0272918 A1* | 11/2008 | Ingersoll | A61B 5/0002 340/573.1 |
| 2009/0040040 A1 | 2/2009 | Ben-Itzhak et al. | |
| 2014/0121540 A1 | 5/2014 | Raskin | |
| 2014/0197947 A1 | 7/2014 | Bahorich | |
| 2014/0222174 A1 | 8/2014 | Teller et al. | |
| 2014/0344282 A1 | 11/2014 | Stivoric et al. | |
| 2014/0354427 A1 | 12/2014 | Rapaport et al. | |
| 2015/0099946 A1 | 4/2015 | Sahin | |
| 2015/0220109 A1 | 8/2015 | von Badinski et al. | |
| 2015/0250419 A1 | 9/2015 | Cooper et al. | |

(Continued)

FOREIGN PATENT DOCUMENTS

WO 2015148225 A2 10/2015

OTHER PUBLICATIONS

Cohenca-Shiby, et al., "The Relationship between Mothers' Attachment Orientations and Their Infants' Sleep Patterns", In Journal of Hindawi—Child Development Research, Sep. 2013, 7 pages.

(Continued)

*Primary Examiner* — Tai T Nguyen
(74) *Attorney, Agent, or Firm* — A.C. Entis-IP Ltd.

(57) ABSTRACT

A system for providing care to a ward that alerts a caregiver of the caregiver's capacity to deal competently with the ward's needs.

20 Claims, 2 Drawing Sheets

(56) References Cited

U.S. PATENT DOCUMENTS

| | | | | |
|---|---|---|---|---|
| 2016/0117901 | A1* | 4/2016 | Zhang | G06F 19/345<br>340/286.07 |
| 2016/0292982 | A1* | 10/2016 | Pradeep | A61B 5/002 |

OTHER PUBLICATIONS

Frank Bentley, et al. Health Mashups: Presenting statistical patterns between wellbeing data and context in natural language to promote behavior change, In Journal of ACM Transactions on Computer-Human Interaction, vol. 20, Issue 5, Nov. 2013, 25 pages.

Keith Shaw, Sync Smartband: Tracking your kids without a leash or Ankle Bracelet, Cool Tools, Network World, Jul. 30, 2014, 4 pages.

* cited by examiner

CAREGIVER MONITORING SYSTEM

TECHNICAL FIELD

Embodiments of the disclosure relate to methods and systems for alerting caregivers regarding status of the caregivers and wards in their care.

BACKGROUND

A growing portion of the world's population includes people such as children, elderly, and disabled, who require monitoring and care from caregivers on a constant or nearly constant basis. Wards in the care of caregivers often have urgent needs that require assistance from a caregiver to tend to. In today's fast paced world, parents and other caregivers frequently have many responsibilities that require their attention in addition to caring for their children or for wards in their care.

SUMMARY

An aspect of an embodiment of the disclosure relates to providing a caregiver system (CARES or CARES system) for alerting a caregiver of a ward's need for assistance that alerts the caregiver to the caregiver's capacity to respond to the ward's need.

In accordance with an embodiment of the disclosure, CARES may comprise at least one ward sensor, at least one caregiver sensor, and a computing system configured to communicate with the at least one caregiver and at least one ward sensor.

The at least one ward sensor is configured to generate signals, hereinafter also referred to as ward monitor signals, based on at least one or any combination of more than one parameter, which may be referred to as a ward monitor parameter, characterizing the ward and/or ward surroundings, which may be used to determine a need state for the ward. A need state of a ward provides an indication of whether or not the ward exhibits a need for which a caregiver response is advisable, and if the ward exhibits such a need, optionally how serious or urgent is the need. The at least one caregiver sensor is configured to generate caregiver monitor signals based on at least one or any combination of more than one caregiver monitor parameter that may be used to characterize the caregiver and/or caregiver surroundings, and to determine a caregiver response state that provides a measure of the caregiver's capacity to respond competently to the ward's need state. A caregiver or ward monitor parameter may by way of example include a parameter defining an environmental parameter, a physiological parameter, and/or a behavioral parameter of the caregiver or ward. A caregiver or ward monitor signal may be a signal that provides a measure of a monitor parameter for the caregiver or ward respectively, or may be a signal that can be processed to provide a measure of the monitor parameter. A caregiver may be considered to competently respond to a ward need if the caregiver undertakes timely activity appropriate to the need so that, as indicated by the ward need state, the need abates, the need does not exacerbate, the need no longer exists, or in recognition that the need requires resources that the caregiver is not equipped to provide, soliciting such resources.

The computer system, which may be cloud based, is configured to receive and process the ward and caregiver monitor signals to generate the ward's need state and the caregiver's response state and determine a "performance match" between the states. In the case where the ward's state indicates that the caregiver intervention is advised or required, the computer system generates a caregiver alert that alerts the caregiver to the ward's need state and the caregiver's capacity to respond competently to the need state. If the performance match indicates that the caregiver response state is impaired relative to the ward need state, CARES may alert the caregiver and/or an alternate caregiver that the caregiver needs assistance of the alternate caregiver in attending to the need of the ward. In an embodiment, CARES may provide alerts to the caregiver independent of the ward's need state to provide the caregiver with real time assessment of the caregiver's response state to indicate whether or not the caregiver's response state is adequate to the task of dealing competently with ward need states that might be expected during a period for which the caregiver is responsible for the ward.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the detailed description below a configuration of a CARES system in accordance with an embodiment of the disclosure is discussed with reference to FIG. 1. An algorithm by which a CARES system in accordance with an embodiment may determine a caregiver's capacity to deal with a ward's need is discussed with reference to the flow diagram shown in FIG. 2

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive “or” rather than the exclusive or, and indicates at least one of, or any combination of more than one of items it conjoins.

Figure 1:
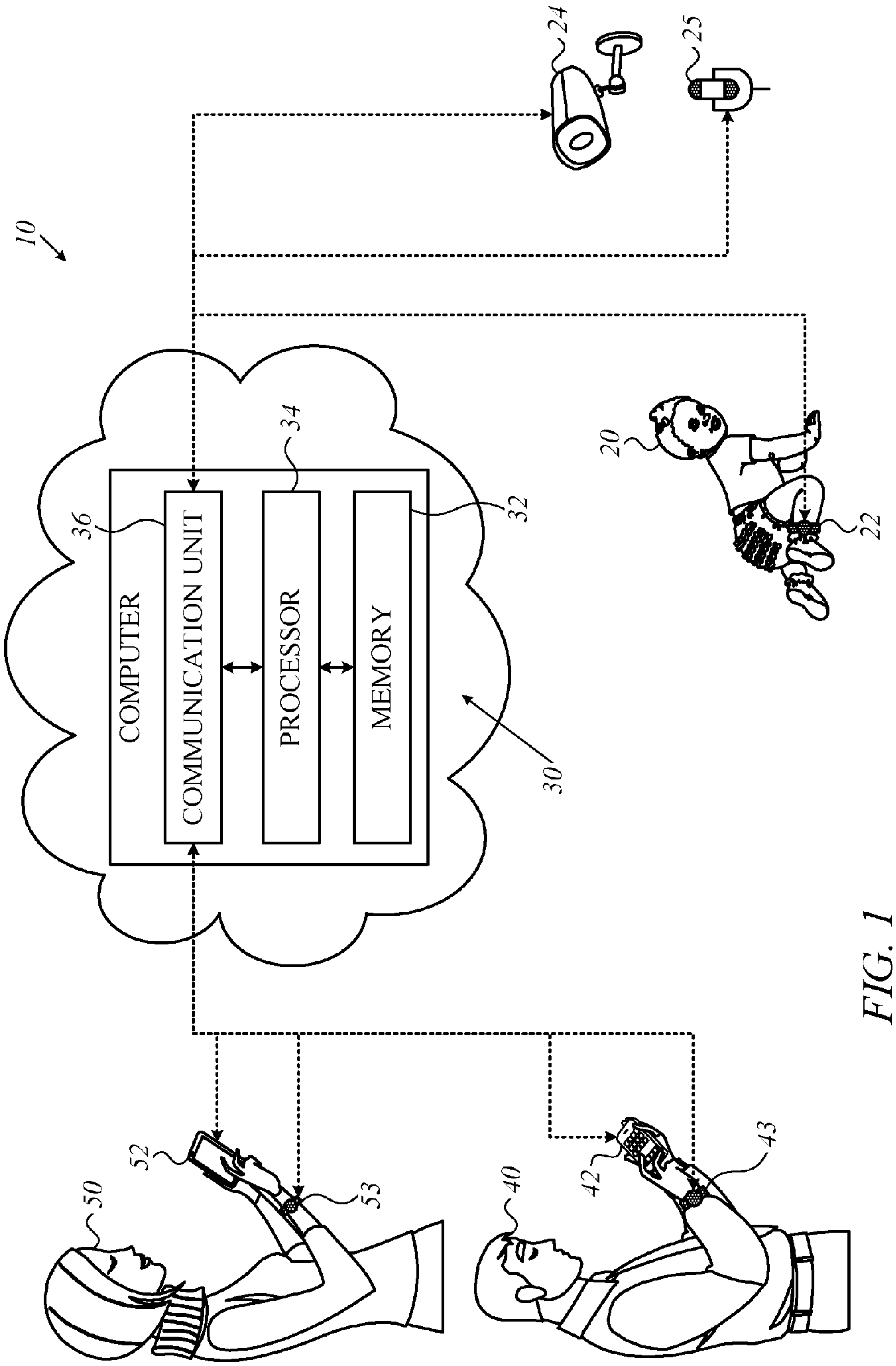
FIG. 1 schematically shows elements of a caregiver system (CARES) in accordance with an embodiment of the disclosure.

FIG. 1 schematically shows a CARES system 10 according to an embodiment of the disclosure operating to alert at least one caregiver to a ward’s need and to a capacity of the at least one caregiver to deal competently with the ward’s need. By way of example, in FIG. 1 the ward is shown as a child 20, and the at least one caregiver is schematically shown as a first caregiver 40 and a second caregiver 50 of the child.

The CARES system in accordance with an embodiment may comprise at least one ward sensor that generates signals, ward monitor signals, based on at least one ward monitor parameter, and at least one caregiver sensor that generates signals, caregiver monitor signals, based on at least one caregiver monitor parameter. CARES 10 comprises a computer system 30 configured to communicate with a ward sensor of the at least one ward sensor and a caregiver sensor of the at least one caregiver sensor. Computer system 30 may, as schematically shown in FIG. 1, be a cloud based computer system.

In FIG. 1, by way of example, the at least one ward sensor comprises an anklet sensor 22 worn by child 20, an imaging system represented by a camera 24 that acquires images of the child, and an audio system represented by a camera 25 that records the child’s vocalizations. Anklet sensor 22 may be configured to generate signals responsive to any of various ward monitor parameters that may be used to indicate a need state of child 20. For example anklet 22 may detect and generate monitor signals based on at least one or any combination of more than one ward monitor parameter: heart rate, skin temperature, skin surface potential, blood pressure, moisture level, hydration level optionally based on sweat monitoring, blood sugar level, oxygen saturation, and/or activity level optionally based on detection of leg motion. Anklet 22, may comprise wireless communication circuitry that enables the anklet to communicate with computer system 30 and transmit to the computer system monitor signals that the anklet generates based on the monitor parameters.

Imaging system 24 and audio system 25 comprise wire or wireless communication circuitry that enables the imaging system and the audio system to communicate with computer system 30 and transmit to the computer system monitor signals that they may respectively generate based on monitor parameters that they are used to monitor. By way of example, imaging system 24 may provide RGB (red, green, blue) and/or IR (infrared) images of child 20. RGB images provided by imaging system 24 may be used to determine facial gestures that the child makes which may be processed by computer system 30 to determine whether, by way of example, child 20 is happy, sad, crying, and/or in need of a diaper change. RGB and/or IR images of the child provided by imaging system 24 may also be used to determine the child’s skin tone. The images may be processed by computer system 30 to indicate a physiological parameter of the child, such as body temperature, level of excitement, and/or heartbeat. In an embodiment, imaging system 24 may comprise a range camera that provides range images of child 20. Computer system 30 may process range images to determine location and/or position of child 20 and a type of physical activity the child is engaged in, as well as gestures the child may be making.

Audio system 25 may transmit sound recordings of vocalizations that child 20 may make as well as recordings of sounds produced in the environment in which the child is located. Sound recordings that audio system provides to computer system 30 may be processed by the computer system to determine characteristics of sounds that child 20 may make, such as pitch, intensity, presence of plosives, sibilants, crying, laughing, cooing, which may be used to determine a need state of the child. The sound recordings may be processed by computer system 30 to identify environmental sounds that may be used to determine a need state of the child. Environmental sounds that may be identified and used to indicate a need state of child 20 may, by way of example, include loud sounds that may awaken or frighten the child, or background sounds that characterize the child’s environment and may be used to determine an environment in which child 20 is present and/or monitor changes in the environment that may affect the child’s current or future need state. For example computer system 30 may advantageously identify environmental sounds to determine if the child is in a car, if the car is moving, if the car air-conditioner is operating and if the car is in traffic.

Communication circuitry that a ward sensor, such as anklet 22, imaging system 24, and/or audio system 25 comprises may enable the ward sensor to communicate with computer system 30 via any suitable communication system, such as a mobile communication network, the internet, the public switched telephone network (PSTN), WiFi, and/or Bluetooth. In an embodiment, one of the at least one ward sensor that monitors child 20 to generate monitor signals may communicate with computer system 30 via another communication device. For example, anklet 22 may communicate with computer system 30 via a transceiver, which may be a standalone transceiver or a transceiver comprised in imaging system 24 or audio system 25.

The at least one caregiver sensor may comprise, as shown by way of example in FIG. 1, at least one dedicated sensor and/or at least one sensor comprised in a mobile communication device that the caregiver may wear and/or operate. By way of example, FIG. 1 schematically shows caregivers 40 and 50 wearing smart watches 43 and 53 respectively and respectively operating mobile communication devices 42 and 52. The smart watch and mobile communication device that each caregiver 40 and 50 has may be configured to generate caregiver monitor signals based on any or any combination of various environmental, physiological, and/or a behavioral monitor parameters. Caregiver monitor parameters may include any monitor parameter referred to with respect to ward monitor parameters or any combination of more than one of such monitor parameters. A caregiver monitor parameter may be a parameter determined relative to a corresponding monitor parameter of the caregiver’s ward. For example, a caregiver parameter may be a distance of the caregiver from a ward, or strength of the caregiver to physically lift or restrain a ward. For example for child 20, a caregiver parameter for first and second caregivers 40 and 50 may be their respective distances from the child as determined from a location, optionally by way of example, known or provided by a sensor, of the child and a location, optionally provide by the caregiver’s smartphone, of the caregiver. If the ward were a patient that might have to be restrained a caregiver parameter might be a size of the caregiver relative to a size of the ward.

In an embodiment, mobile communication device 52 and/or smartwatch 53 may provide a location for first caregiver 40 or second caregiver 50 or their respective levels of activity, for example if first caregiver 40 or 50 is walking, running, or sitting quietly. Mobile communication device 42 and/or 52 may comprise a gesture recognition system that images caregiver 40 and/or 50 if the caregiver looks at the mobile communication device. The communication device may transmit the images to computer system 30 for processing or may itself process the images to determine an emotional and/or physical state of the caregiver based on the images. For example, mobile communication device 42 may determine whether the caregiver is tired, happy, or angry from an image of the caregiver and generate caregiver monitor signals responsive to the determination. A caregiver sensor, mobile communication device 42 and smartwatch 43 that first caregiver 40 may use and a caregiver sensor, mobile communication device 52 and smartwatch 53 that second caregiver 50 may use may be configured to communicate with computer system 30 via any suitable communication system. Optionally, one of the at least one caregiver sensors that caregiver 40 or 50 uses may communicate with the computer system via another of the at least one caregiver sensor. For example, smartwatch 43 that first caregiver 40 uses may communicate with mobile communication device 42 via Bluetooth to communicate with computing system 30.

Computer system 30 comprises a memory 32, a processor 34 and a communication unit 36. Computer system 30 and its associated memory 32, processor 34, and communication unit 36 may be partly or entirely incorporated within a smartphone, a desktop computer, a laptop computer, a phablet, a tablet, a smartwatch and/or a server. Optionally, computer system 30 may be a "distributed system" with code and hardware components located in different, physically distinct locations, for example, computing device may be a "cloud computer" housed on the world wide web (WWW) and accessible via internet. Optionally computer system 30 is comprised at least partly in an apparatus used by caregiver 40 and or caregiver 50. For example, computer system 30 may be comprised in mobile communication device 42 and/or mobile communication device 52 that is optionally configured to operate as a caregiver sensor, in accordance with an embodiment of the disclosure Memory 32 may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). Processor 34 may comprise any electronic and/or optical processing circuitry configured to operate and provide functionalities that computer system 30 provides for CARES 10. The processor may by way of example comprise any one or any combination of more than one of, a microprocessor, an application specific circuit (ASIC), field programmable array (FPGA) and/or system on a chip (SOC). Communication unit 36 may be configured to enable computer system 30 to communicate with ward and caregiver sensors comprised in CARES 10 via any suitable communication system, such as a mobile communication network, the public switched telephone network (PSTN), WiFi, and/or Bluetooth. In an embodiment memory 32, processor 34 and communication unit may be virtual.

Figure 2:
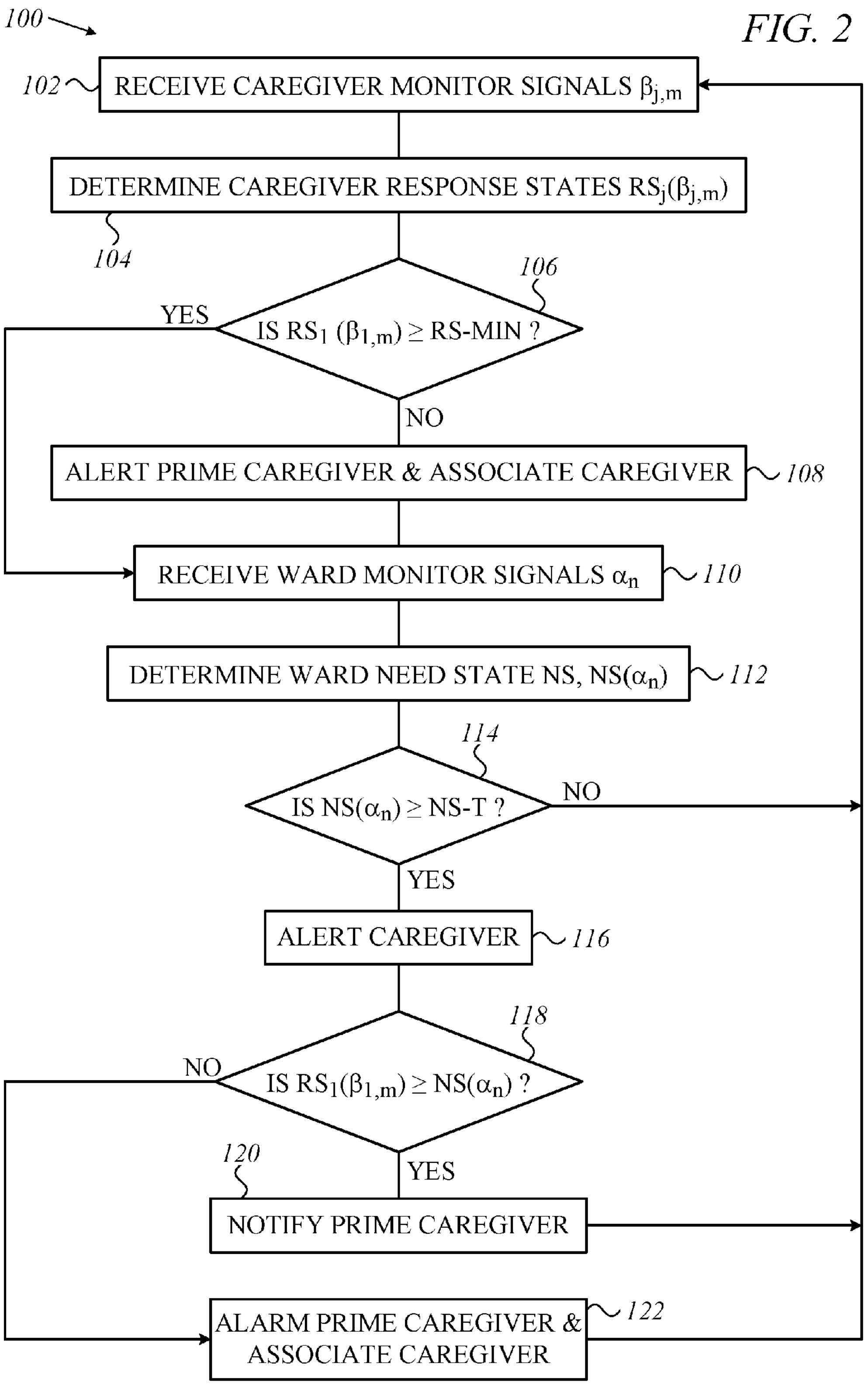
FIG. 2 shows a simplified flow diagram depicting a method by which CARES may alert a caregiver to a ward's need, in accordance with an embodiment of the disclosure.

FIG. 2 shows a flow diagram of an algorithm 100 that CARES 10 may execute to alert a caregiver or caregivers of a number of, J, caregivers responsible for a ward's need and the capacity of the caregiver(s) to respond competently to the need, in accordance with an embodiment of the disclosure. Let the various ward monitor signals that the at least one ward sensor generates comprise signals for N different types of ward monitor parameters $\alpha_n$, $1 \le n \le N$. Let the various caregiver monitor parameters for a j-th caregiver of the J caregivers for which the at least one caregiver sensor generates monitor signals be represented by $\beta_{j,m}$, $1 \le m \le M$. By way of example, in the discussion of algorithm 100 it is assumed for convenience of presentation that the number of caregivers J is equal to 2, that the caregivers are first and second caregivers shown in FIG. 1 and that the ward is a child 20. First caregiver 40 may be referred to as a "prime" caregiver of child 20 and is referenced by the subscript j=1, and caregiver monitor parameters for first caregiver 40 are represented by $\beta_{1,m}$. Second caregiver 50 may be referred to as an associate caregiver of child 20 and is referenced by the index j=2, and caregiver monitor parameters for second caregiver 50 are represented by $\beta_{2,m}$.

In a block 102 of algorithm 100 computer system 30 of CARES 10 receives caregiver monitor signals for monitor parameters $\beta_{j,m}$ for $1 \le j \le J=2$, and $1 \le m \le M$, for first caregiver 40 and second caregiver 50. In a block 104 computer system 30 optionally processes the signals and caregiver monitor parameters $\beta_{j,m}$ to determine respective response states $RS_j(\beta_{j,m})$ $1 \le j \le J$ for the J (in the current scenario assumed equal to 2) caregivers as a function of their monitor parameters $\beta_{j,m}$. In an embodiment of the disclosure, $RS_j(\beta_{j,m})$ may be configured to provide a numerical value for a j-th caregiver that provides a measure of the j-th caregiver's capacity to respond to a need state of the ward.

By way of example, $RS_j(\beta_{j,m})$ may be configured to assume a value in accordance with a constraint $0 \le RS_j(\beta_{j,m}) \le Q$. The maximum value, Q, that $RS_j(\beta_{j,m})$ may assume indicates a maximum caregiver response state for which a caregiver is considered to have a maximum capacity to respond competently to the ward's needs. In an embodiment, Q may be equal to 10 and $RS_j(\beta_{j,m})$ may be defined by an expression $RS_j(\beta_{j,m})=10\mathrm{Max}(\{1-\Sigma\omega_{j,m}[(\beta_{j,m}-\beta_{oj,m})/\sigma_{j,m}]^2\},0)$. In the expression for $RS_j(\beta_{j,m})$, Max is the maximum function, which assumes a value equal to a value provided by the expression in the curly brackets if the value is greater than 0 and a value of 0 otherwise. In the expression in curly brackets, the sum for a given j, is over m for $1 \le m \le M$, $\beta_{oj,m}$ is an optimal value for the m-th monitor parameter $\beta_{j,m}$, $\sigma_{j,m}$ is a standard deviation of $\beta_{j,m}$, the $\omega_{j,m}$ are positive weighting coefficients that satisfy a constraint, $0 < \Sigma\omega_{j,m} \le 1$. The expression for $RS_j(\beta_{j,m})$ may assume a maximum value of 10.

In a decision block 106 computer system 30 optionally determines whether the response state $RS_1(\beta_{1,m})$ determined for the prime caregiver, first caregiver 40, is greater than or equal to a minimum threshold RS-MIN for which a caregiver is considered capable of dealing appropriately with a need state of child 20. If the response state $RS_1(\beta_{1,m})$ is greater than RS-MIN, the first caregiver may be considered capable of competently handling expected need states of child 20 and computer system 30 proceeds to a block 110. If on the other hand $RS_1(\beta_{1,m})$ is less than RS-MIN, CARES 10 might consider that the first caregiver is not in condition for competently dealing with possible need states of child 20 and proceed to a block 108. In block 108 CARES may generate and transmit an alarm to first caregiver 40 as well as to second caregiver 50 indicating that the first caregiver is not in condition to deal with child 20 and that they should take steps to assure proper care for the child. In an embodiment if the second caregiver's response state $RS_1(\beta_{1,m})$ is greater than RS-MIN, CARES 10 may suggest that the second caregiver 50 is in proper condition to deal with child 20 and that optionally second caregiver 50 should become a prime caregiver for the child first caregiver. Optionally CARES proceeds from block 108 to block 110.

In block 110 computer system 30 receives signals for ward monitor parameters $\alpha_n$ for child 20 generated by anklet 22, imaging system 24, and/or audio system 25, and optionally in a block 112 determines a need state $NS(\alpha_n)$ for the child as a function of monitor parameters $\alpha_n$. In an embodiment, $NS(\alpha_n)$ may be a function that assumes positive numerical values greater than or equal to 0, where a need state $NS(\alpha_n)=0$ indicates that child 20 does not require caregiver assistance, and a larger value of $NS(\alpha_n)$ indicates more acute need states of the child than a smaller value of $NS(\alpha_n)$.

By way of example, need state $NS(\alpha_n)$ may be defined by an expression of the form $NS(\alpha_n)=K\Sigma\gamma_n[(\alpha_n-\alpha_{o,n})\sigma_n]^2$. In the expression for $NS(\alpha_n)$ the sum is over n for $1\leq n\leq N$, $\alpha_{o,n}$ is an optimum value for $\alpha_n$, $\sigma_n$ is a standard deviation of $\alpha_n$, $\gamma_n$ is a positive weighting coefficient for the n-th monitor parameter, and K is a proportionality constant. In an embodiment, $\Sigma\gamma_n=1$ and K may be set equal to Q, so that for $[(\alpha_n-\alpha_{o,n})/\sigma_n]^2=1$ for all n, the need state $NS(\alpha_n)$ has a value that is equal to the maximum for the response state $RS_1(\beta_{1,m})$ of first caregiver 40.

In a decision block 114 computer system 30 determines if the need state $NS(\alpha_n)$ of child 20 is greater than a threshold need state NS-T indicating that first caregiver 40 should be alerted that child 20 needs assistance. If $NS(\alpha_n)$ is less than or equal to NS-T, CARES 10 may decide not to alert first caregiver 40, and computing system 30 may return to block 102 to receive caregiver monitor signals and update values of monitor parameters $\mu_{j,m}$. For example a threshold need state NS-T for alerting first caregiver 40 may be equal to 2. For values of $NS(\alpha_n)$ less than 2, CARES 10 may decide not to alert first caregiver 40 and computing system 30 may return to block 102 to receive caregiver monitor signals and update values of monitor parameters $\beta_{j,m}$.

If on the other hand $NS(\alpha_n)$ is greater than NS-T, computing system 30 may proceed to a block 116 and alert the prime caregiver, first caregiver 40, that child 20 is in need of assistance and that the need has an urgency indicated by the value of $NS(\alpha_n)$ determined in block 112. The alert sent to first caregiver 40 may be a visual and/or an audible alert generated, for example, on the first caregiver's smart phone 42 and/or smartwatch 43. A visual alert may comprise a text message and/or a graphical message, and may be color coded or otherwise graphically configured not only to alert first caregiver 40 to the need of child 20 but also to a severity of the need. An audio alert may also be generated on the first caregiver's smartphone and/or smartwatch and may be configured so that the audio alert indicates a severity of the child's need.

In a decision block 118 CARES 10 may "match" a response state of first caregiver 40 when the first caregiver is alerted to the need state of child 20 to determine if the first caregiver is able to competently handle the child's need. Optionally computer system 30 makes the determination by comparing the first caregiver's response state $RS_1(\beta_{1,m})$, optionally determined in block 104, to the child need state $NS(\alpha_n)$, optionally determined in block 112, to determine if $RS_1(\beta_{1,m})$ is greater than $NS(\alpha_n)$. If it is, CARES 10 may proceed to a block 120 and notify first caregiver 40 that the first caregiver's response status $RS_1(\beta_{1,m})$ indicates that the first caregiver appears able to deal competently with the child's need state $NS(\alpha_n)$. The notification may also indicate to the first caregiver to what degree the caregiver's capacity to respond to the need state of child 20 is above a minimum required to respond to the child's need state. For example, the notification might indicate that the capacity of the first caregiver to respond as indicated by response state $RS_1(\beta_{1,m})$ is substantially more than what might be required, or is marginally sufficient to what might be required to respond to the child's need state.

In an embodiment, a degree to which the capacity of first caregiver 40 to deal competently with the need state of child 20 may be determined by how much numerical response state $RS_j(\beta_{1,m})$ is greater than the child's need state NS $(\alpha_n)$. For example if the need state $NS(\alpha_n)$ of child 20 is equal to 5.8 and the response state of first caregiver 40 is equal to 9, CARES 10 might notify the first caregiver that the first caregiver capacity to handle the child's need is more than enough and that the first caregiver should not have any particular worries about dealing with the child need state. On the other hand if the first caregiver's response state is equal to 6, CARES 10 might notify the first caregiver that whereas the first caregiver response state is enough to handle the child's current need state, the first caregiver resources for handling future need states of the child are close to being exhausted and first caregiver 40 should consider alerting the associate caregiver, second caregiver 50, that the first caregiver expects shortly to need assistance of second caregiver 50 in caring for child 20. From block 120, CARES 10 may return to block 102 to receive and process monitor signals generated by the at least one caregiver sensor for the monitor parameters of first caregiver 40 and second caregiver 50 and to update their monitor parameters and response states $RS_1(\beta_{1,m})$ and $RS_2(\beta_{2,m})$.

If on the other hand in decision block 118 CARES 10 determines that the response state $RS_1(\beta_{1,m})$ of first caregiver 40 is less than $NS(\alpha_n)$, CARES optionally proceeds to a block 122. In block 122 CARES 10 generates an alarm for both first caregiver 40 and second caregiver 50 informing the first caregiver and second caregiver that the first caregiver does not appear to be able to deal with the need state of their child 20. The alert may recommend that the second caregiver immediately assist the first caregiver in arranging for care for child 20. In an embodiment, the alert and recommendation may be based on the second caregiver's response state $RS_2(\beta_{2,m})$, optionally determined for second caregiver 50 in block 104. For example, if the second caregiver's response state $RS_1(\beta_{1,m})$ is greater than RS-MIN, CARES 10 may suggest that second caregiver 50 become a prime caregiver for the child or active co-caregiver with first caregiver 40 for the child until such time as the first caregiver's response state indicates the first caregiver is in condition to care for child 20. Optionally CARES 10 returns to block 102 from block 122. If neither the first nor second caregiver 40 or 50 exhibits a suitable response state $RS_j(\beta_{j,m})$ CARES 10 may alert the caregiver 40 or 50 having a largest response state value to answer to the needs of child 20. CARES 10 may also notify both caregivers that neither appears to exhibit, as indicated by their respective response states, appropriate capacity to deal with the needs of child 20 and optionally suggest that the caregivers solicit additional support in caring for the child.

Whereas in the above description a first caregiver is designated as a prime caregiver and a second caregiver as an associate caregiver, a CARES system in accordance with an embodiment of the disclosure is not limited to alerting and providing information to caregivers that are ranked in a hierarchy of caregivers. For any given time at which a need state of a ward in the care of a plurality of caregivers indicates that caregiver intervention is advisable, CARES in an embodiment may alert a caregiver or caregivers of the plurality of caregivers best suited at the given time to provide for the ward's need to do so. For example, assume a CARES system in accordance with an embodiment of the disclosure generates numerical response states $RS_j(\beta_{j,m})$, $1 \le j \le J$ for J caregivers, and numerical need states $NS(\alpha_n)$ for a ward in the care of the caregivers. CARES 10 in accordance with an embodiment of the disclosure may alert a j-th caregiver having a maximum response state $RS_j(\beta_{j,m})$, or a response state $RS_j(\beta_{j,m})$ closest to and greater than a need state $NS(\alpha_n)$ of a ward, at a time at which the ward exhibits a need requiring caregiver attention to respond to the ward's need.

In the above description a caregiver response state is indicated as being determined by processing caregiver monitor signals generated by at least one caregiver sensor responsive to monitor parameters of the caregiver. In an embodiment, a caregiver response state may be a function of profile data acquired directly or indirectly for the caregiver. Directly acquired profile data comprises data that the caregiver inputs to computer system 30 and includes by way of example, data defining the caregivers, gender, age, health condition, physical and mental stamina, and preferences. Indirect caregiver profile data comprises data that is inferred from the caregiver's behavior. Indirect caregiver profile data may comprise data characterizing caregiver habits, such as how frequently the caregiver accesses social networks and how the caregiver interacts with the social networks, and time resolved histories of the caregiver monitoring parameters, such as blood pressure, heart rate, and body temperature. Indirect caregiver profile data may comprise measures of past performance of the caregiver in responding to a ward's need states. For example, a measure of past performance of a caregiver may comprise a rise time of a caregiver monitor parameter from a normative value of the parameter to an excited value of the parameter when the caregiver is challenged by a ward's need state. Similarly a measure of past caregiver performance may comprise a fall time of an excited caregiver monitor parameter from an excited value back to a normative value for the parameter following dealing with a ward's need. A measure of caregiver performance may include rise times and fall times respectively away from and back to normative values of ward monitor parameters in response to entering a need state requiring the caregiver's care and receiving the care. Monitor parameter rise and fall times for a given caregiver and ward "pair" may be correlated to determine or adjust caregiver response states and ward need states for the pair when the given ward is in the care of the given caregiver.

Similarly to circumstances for caregiver response states, ward need states may be determined as dependent on directly and/or indirectly acquired profile data for a ward. And a ward's need states may be functions of an identity of a caregiver in whose care the ward may be entrusted.

In an embodiment of the disclosure, for which numerical values are determined for response states and/or need states as functions of weighted parameter values, profile data may be incorporated into the functions by determining weights for the parameters based on profile data. For example, if a child historically exhibits frequent crying episodes that do not appear highly correlated with real need when cared for by a first caregiver, but general absence of crying when in the care of a second caregiver, a crying monitor parameter might have an increased weight for determining a need state of the child when in the care of the second caregiver.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. A system for providing alerts to a caregiver of a ward, the system comprising:

at least one caregiver sensor configured to generate and transmit caregiver monitor signals responsive to at least one caregiver parameter useable to characterize a response state of the caregiver indicative of the caregiver's capacity to respond to a need of the ward; and a computer system configured to receive the caregiver monitor signals and process the signals to determine a caregiver response state based on the at least one caregiver monitor parameter indicative of the caregiver's capacity to respond competently to the need of the ward and to generate an alert signal for the caregiver based on the caregiver response state;

wherein the at least one caregiver parameter comprises a physiological parameter, and/or a behavioral parameter of the caregiver.

2. The system according to claim 1 wherein the computer system determines the caregiver response state as a function of profile data of the caregiver.

3. The system according to claim 1 and comprising at least one ward sensor configured to generate and transmit ward monitor signals responsive to at least one ward parameter useable to characterize a need state of the ward that is indicative of the ward's need for assistance of the caregiver, and wherein the computer system is configured to receive the ward monitor signals and process the signals to determine the need state of the ward based on the at least one ward monitor parameter.

4. The system according to claim 3 wherein the at least one ward parameter comprises at least one or any combination of more than one of an environmental parameter, a physiological parameter, or a behavioral parameter of the ward.

5. The system according to claim 3 wherein the computer system determines the need state for the ward as a function of profile data of the ward.

6. The system according to claim 3 wherein the computer system is configured to determine if the caregiver response state indicates that the caregiver has capacity to deal competently with the need of the ward indicated by the need state.

7. The system according to claim 6 wherein the alert comprises an alarm indicating that the caregiver does not appear to have capacity to deal with the ward's need if the caregiver response state indicates that the caregiver does not have capacity to deal competently with the need.

8. The system according to claim 7 wherein the alarm indicating apparent insufficient capacity is configured to advise the caregiver to seek assistance from another caregiver.

9. The system according to claim 6 wherein the computer system is configured to transmit an alarm to a person other than the caregiver advising the person that the caregiver does not appear to have capacity to deal competently with the need of the ward if the caregiver response state indicates that the caregiver does not have capacity to deal competently with the need.

10. The system according to claim 3 wherein the computer system is configured to determine the caregiver response state as a function of the need state of the ward.

11. The system according to claim 6 wherein the computer system is configured to provide a numerical value for the need state of the ward.

12. The system according to claim 11 wherein the numerical value of the need state is determined based on a numerical value for an expression $\Sigma\gamma_n[(\alpha_n-\alpha_{o,n})/\sigma_n]^2$, where $\alpha_n$ represents a value for an n-th monitor parameter of N ward monitor parameters, the sum is over n for $1 \le n \le N$, $\alpha_{o,n}$ is an optimum value for $\alpha_n$, $\sigma_n$ is a standard deviation of $\alpha_n$, $\gamma_n$ is a weighting coefficient for the n-th monitor parameter.

13. The system according to claim 11 wherein the computer system is configured to provide a numerical value for the response state of the caregiver.

14. The system according to claim 13 wherein the numerical value of the response state is determined based on a numerical value for an expression $(1-\Sigma\omega_m[(\beta_m-\beta_{o,m})/\sigma_m]^2)$, where $\beta_m$ represents a value for an m-th monitor parameter of M caregiver monitor parameters, the sum is over m for $1 \le m \le M$, $\beta_{o,m}$ is an optimal value for $\beta_m$, $\sigma_m$ is a standard deviation of $\beta_m$, and $\omega_m$ is a weighting coefficient for $\beta_m$.

15. The system according to claim 12 wherein the computer system is configured to compare the numerical values of the need state and the response state to determine if the caregiver has capacity to deal competently with a need of the ward indicated by the need state.

16. The system according to claim 1 and comprising a gesture recognition system configured to acquire images of the caregiver usable by the computer system to determine the physiological parameter, and/or behavioral parameter of the caregiver.

17. A method for providing care to a ward, the method comprising:

receiving caregiver monitor signals based on at least one caregiver monitor parameter comprises a physiological parameter and/or a behavioral parameter of the caregiver;

processing the signals to determine a caregiver response state based on the at least one caregiver monitor parameter indicative of the caregiver's capacity to respond competently to a need of the ward; and generating an alert signal for the caregiver based on the caregiver response state.

18. The method according to claim 17 and receiving ward monitor signals based on at least one ward monitor parameter and processing the ward monitor signals to determine a need state of the ward based on the at least one ward monitor parameter.

19. The method according to claim 18 and comprising determining if the caregiver response state indicates that the caregiver has capacity to deal competently with the need of the ward indicated by the need state.

20. The method according to claim 19 wherein the alert comprises an alarm indicating that the caregiver does not appear to have capacity to deal competently with the ward's need if the determination indicates that the caregiver does not have capacity to deal competently with the need.

* * * * *